United States Patent
Kubo

(12) 
(10) Patent No.: US 6,705,274 B2
(45) Date of Patent: Mar. 16, 2004

(54) IN-CYLINDER DIRECT INJECTION SPARK-IGNITION INTERNAL COMBUSTION ENGINE

(75) Inventor: Masaaki Kubo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/163,422

(22) Filed: Jun. 7, 2002

(65) Prior Publication Data

US 2002/0195079 A1 Dec. 26, 2002

(30) Foreign Application Priority Data

Jun. 26, 2001 (JP) .......................................... 2001-192447

(51) Int. Cl.[7] .............................................. F02B 17/00
(52) U.S. Cl. ...................... 123/295; 123/305; 239/490; 73/861.22
(58) Field of Search .......................... 123/292, 295–305; 73/861.32, 861.33; 239/533.11, 533.12, 490, 492, 493

(56) References Cited

U.S. PATENT DOCUMENTS 5,934,571 A * 8/1999 Schmidt et al. .......... 239/533.9
6,206,304 B1 * 3/2001 Koseki et al. ......... 239/533.12
6,520,144 B2 * 2/2003 Shiraishi et al. ............ 123/301

FOREIGN PATENT DOCUMENTS

JP          8-042427          2/1996

* cited by examiner

Primary Examiner—Willis R. Wolfe
Assistant Examiner—Johnny H. Hoang
(74) Attorney, Agent, or Firm—Foley & Lardner

(57) ABSTRACT

In a direct injection spark-ignition engine with a swirl fuel injector, an orifice nozzle tip has an inclined surface that is formed on the lower end face of the orifice nozzle tip and inclined by a predetermined inclination angle with respect to a reference plane normal to an orifice axis. The predetermined inclination angle is based on both an in-cylinder pressure dependent spray angle during the stratified-charge late fuel injection on the compression stroke and an in-cylinder pressure dependent spray angle during the homogeneous-charge early fuel injection on the intake stroke. The nozzle hole is formed within the inclined surface of the predetermined inclination angle.

20 Claims, 11 Drawing Sheets

IN-CYLINDER DIRECT INJECTION SPARK-IGNITION INTERNAL COMBUSTION ENGINE

TECHNICAL FIELD

The present invention relates to an in-cylinder direct injection spark-ignition internal combustion engine, and specifically to a so-called DI fuel injector of a direct injection spark-ignition engine that uses at least two combustion modes, namely a homogeneous charge combustion mode (an early injection combustion mode) where fuel-injection early in the intake stroke produces a homogeneous air-fuel mixture, and a stratified charge combustion mode (a late injection combustion mode) where late fuel-injection delays the event until the end of the compression stroke to produce a stratified air-fuel mixture.

BACKGROUND ART

In recent years, there have been proposed and developed various swirl DI fuel injectors suited to direct-injection (DI) spark-ignition gasoline engines. The swirl DI fuel injector often uses a swirl flow component generating means, such as a swirler located upstream of a conically or semi-spherically ended needle valve or a spiral guide groove formed on the outer periphery of the needle valve, in order to give rotational momentum to fuel. One such swirl DI fuel injector has been disclosed in Japanese Patent Provisional Publication No. 8-42427 (hereinafter is referred to as "JP8-42427") and assigned to the assignee of the present invention. In comparison with a non-swirl-flow generating-means equipped DI fuel injector, the swirl DI fuel injector can inject fuel spray of a larger spray angle, thereby enabling a wide range of fuel injection, while effectively atomizing the fuel. Such a swirl DI fuel injector has a peculiar fuel spray characteristic that the shape of fuel spray is a substantially hollow cone and a spray angle is dependent upon an ambient pressure (i.e., a pressure level measured at the outlet side of a fuel injector orifice nozzle hole) as well as a fuel pressure. Concretely, the spray angle of fuel injected tends to become smaller, as the ambient pressure rises. The previously noted peculiar fuel spray characteristic of the swirl DI fuel injector is suitable to a DI gasoline engine equipped with an open combustion chamber type piston in which a piston bowl cavity combustion chamber is recessed in a piston crown and a stratified combustion mode is realized by means of the piston bowl cavity. In such a piston-bowl-cavity equipped DI engine, at partial loads, the engine operates in a stratified combustion mode, with fuel directly injected toward the piston bowl cavity during the compression stroke. In contrast to the above, at higher loads, the engine operates in a homogeneous combustion mode that a homogeneous mixture is introduced, with fuel injected during the intake stroke. During the intake stroke that homogeneous-charge early fuel injection is made, an in-cylinder pressure level is comparatively low, and thus the spray angle tends to increase or widen. The increased spray angle contributes to superior fuel atomization and creation of a homogeneous mixture suited to high load conditions. On the other hand, during the compression stroke that stratified-charge late fuel injection is made, the in-cylinder pressure level is comparatively high, and thus the spray angle tends to decrease or narrow. By virtue of the narrowed spray angle, the fuel spray can be effectively concentrated in the piston bowl cavity during the stratified combustion mode.

However, the previously-noted peculiar fuel spray characteristic of the swirl DI fuel injector is unsuitable to a DI gasoline engine that at least an installation position of a fuel injector and a spray angle are properly set, so that fuel spray injected on the compression stroke is directed directly to the vicinity of a tip of the spark plug and only a discharging gap of the spark plug is exposed to an upper part of the fuel spray, to create a richer air/fuel mixture layer around the spark plug. In case of the DI engine of the spray-angle setting and injector installation position suited to the stratified charge combustion mode, when the DI engine operates in the homogeneous combustion mode with fuel directly injected into the combustion chamber during the intake stroke, due to the relatively low in-cylinder pressure the spray angle tends to become wider than that of the stratified combustion mode. Owing to the undesirably widened spray angle, the fuel spray tends to be delivered to the whole body of the spark plug. This leads to the problem of reduced exhaust-emission control performance, increased unburned hydrocarbons (HCs), and increased deposits of sooty carbon.

SUMMARY OF THE INVENTION

In view of the above, it is desirable to achieve a high level of reconciliation of the homogeneous combustion mode and the stratified combustion mode by optimizing the shape of a tip of a swirl DI fuel injector. The previously described JP8-42427 proposes various shapes of swirl-fuel-injector orifice nozzle tips. JP8-42427 merely teaches the use of a so-called taper-cut orifice nozzle tip that creates a fuel spray of an inclined hollow cone whose axis is inclined with respect to the orifice axis. However, the swirl fuel injector disclosed in JP8-42427 is not designed to reconcile both the homogeneous charge combustion mode and the stratified charge combustion mode. In other words, JP8-42427 fails to teach the interrelationship between the shape of the fuel injector nozzle tip and the fuel spray characteristic that varies owing to an ambient pressure change during execution of fuel injection.

Accordingly, it is an object of the invention to provide an in-cylinder direct injection spark-ignition internal combustion engine capable of switching between a homogeneous charge combustion mode and a stratified charge combustion mode, in which a high level of reconciliation of the homogeneous charge combustion mode and the stratified charge combustion mode can be achieved by optimizing the shape of a tip of a swirl DI fuel injector.

In order to accomplish the aforementioned and other objects of the present invention, an in-cylinder direct injection spark-ignition internal combustion engine capable of switching between a homogeneous combustion mode that homogeneous-charge early fuel injection is executed on an intake stroke and a stratified combustion mode that stratified-charge late fuel injection is executed on a compression stroke, comprises a fuel injector having an orifice nozzle tip in which a nozzle hole is formed to inject fuel through the nozzle hole directly into a combustion chamber, a spark plug that provides a discharging gap in the combustion chamber, a swirl generating device that gives rotational momentum to the fuel flown into the nozzle hole, the orifice nozzle tip having an inclined surface that is formed on an end face of the orifice nozzle tip and inclined by a predetermined inclination angle with respect to a reference plane normal to an orifice axis of the nozzle hole, and the nozzle hole being formed within the inclined surface.

According to another aspect of the invention, an in-cylinder direct injection spark-ignition internal combustion engine capable of switching between a homogeneous combustion mode that homogeneous-charge early fuel injection is executed on an intake stroke and a stratified combustion mode that stratified-charge late fuel injection is executed on a compression stroke, comprises a fuel injector having an orifice nozzle tip in which a nozzle hole is formed to inject fuel through the nozzle hole directly into a combustion chamber, a spark plug that provides a discharging gap in the combustion chamber, a swirl generating device that gives rotational momentum to the fuel flown into the nozzle hole, the orifice nozzle tip having an inclined surface that is formed on an end face of the orifice nozzle tip and inclined by a predetermined inclination angle with respect to a reference plane normal to an orifice axis of the nozzle hole, the predetermined inclination angle being based on both an in-cylinder pressure dependent spray characteristic during the stratified-charge late fuel injection on the compression stroke and an in-cylinder pressure dependent spray characteristic during the homogeneous-charge early fuel injection on the intake stroke, and the nozzle hole being formed within the inclined surface.

According to a further aspect of the invention, an in-cylinder direct injection spark-ignition internal combustion engine capable of switching between a homogeneous combustion mode that homogeneous-charge early fuel injection is executed on an intake stroke and a stratified combustion mode that stratified-charge late fuel injection is executed on a compression stroke, comprises a fuel injector having an orifice nozzle tip in which a nozzle hole is formed to inject fuel through the nozzle hole directly into a combustion chamber, a spark plug that provides a discharging gap in the combustion chamber, a swirl flow component generating means for giving rotational momentum to the fuel flown into the nozzle hole, the orifice nozzle tip having an inclined surface formed on an end face of the orifice nozzle tip and inclined by a predetermined inclination angle with respect to a reference plane normal to an orifice axis of the nozzle hole for creating an inclined substantially hollow cone fuel spray, the predetermined inclination angle of the inclined surface being based on both an in-cylinder pressure dependent spray characteristic during the stratified-charge late fuel injection on the compression stroke and an in-cylinder pressure dependent spray characteristic during the homogeneous-charge early fuel injection on the intake stroke, and the nozzle hole being formed within the inclined surface.

The other objects and features of this invention will become understood from the following description with reference to the accompanying drawings.

DESCRIPTION OF THE PREFERRED EMBODIMENTS

Figure 1:
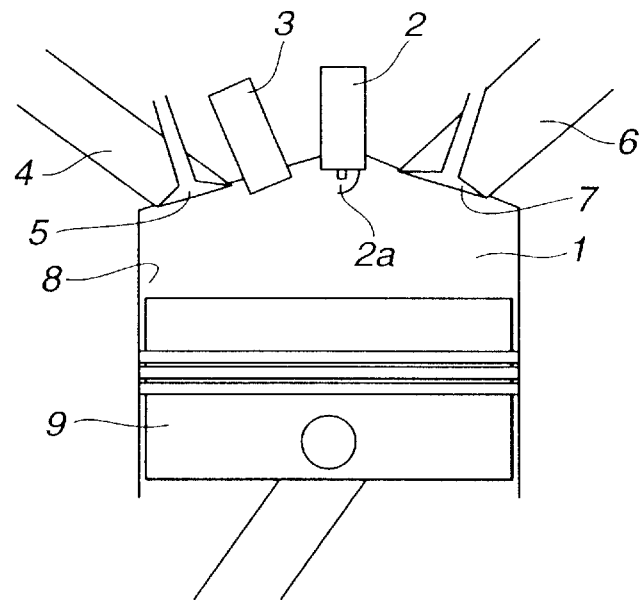
FIG. 1 is a longitudinal cross-sectional view showing an in-cylinder direct injection spark-ignition internal combustion engine (simply, DI engine) of the embodiment.

Referring now to the drawings, particularly to FIGS. 1–7, a swirl DI fuel injector equipped DI engine of the invention is exemplified in a so-called narrow-spacing type four-valve direct injection spark-ignition engine that a swirl DI fuel injector 3 and a spark plug 2 are located adjacent to each other. As shown in FIG. 1, spark plug 2 is located substantially in a middle of the upper portion of a combustion chamber 1. On the other hand, injector 3 is located adjacent to spark plug 2 so that fuel is injected to the vicinity of the spark plug. As can be seen from the left-hand side of FIG. 1, a pair of intake valves 5, 5 are provided near injector 3, to open and close respective intake ports 4, 4. As can be seen from the right-hand side of FIG. 1, a pair of exhaust valves 7, 7 are provided to open and close respective exhaust ports 6, 6, such that the exhaust valve pair is opposed to the intake valve pair. In the drawings, reference sign 8 denotes an engine cylinder, whereas reference sign 9 denotes a reciprocating piston. Reference sign 2a denotes a spark-plug gap or a discharging gap of spark plug 2. As discussed above, the DI engine of the embodiment is a DI engine that the spray angle setting and injector installation position are basically designed to realize a stratified charge combustion mode without depending on a piston bowl cavity formed on the piston crown of piston 9.

Figure 2:
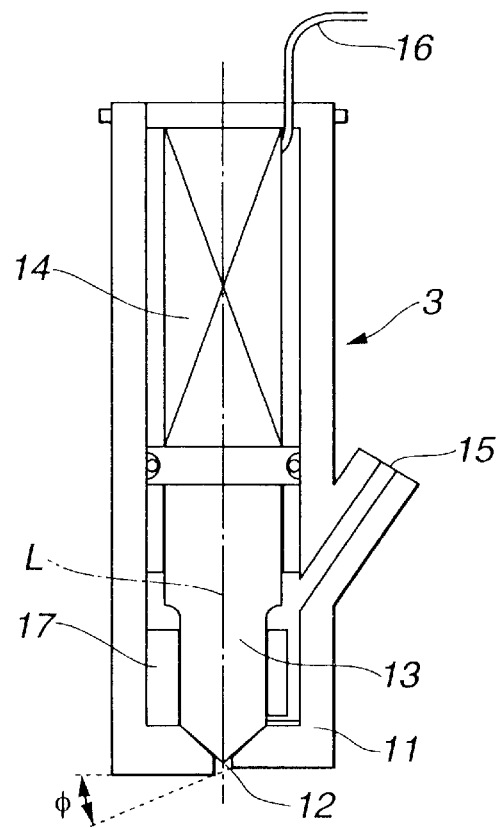
FIG. 2 is a longitudinal cross-sectional view showing a swirl fuel injector employed in the DI engine of the embodiment of FIG. 1.
Figure 3:
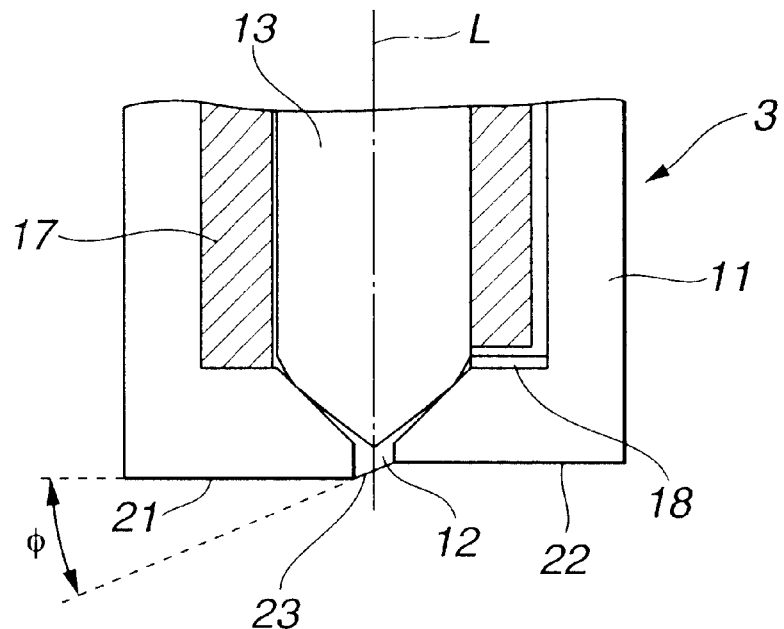
FIG. 3 is a partly enlarged cross-sectional view showing an orifice nozzle tip of the swirl DI fuel injector of FIG. 2.

Referring now to FIGS. 2 and 3, there is shown the detailed structure of injector 3. An orifice or a nozzle hole 12 is centrally formed in a tip of a fuel injector body 11. A conically or semi-spherically ended needle valve 13 is axially slidably accommodated in the fuel injector body so as to open and close the nozzle hole. Needle valve 13 is driven by means of an actuator 14 such as a piezoelectric element, an electromagnetic solenoid or the like. The actuator is energized or de-energized by controlling an exciting current flowing through a lead 16. A swirler chip 17, serving as a swirl flow component generating means, is provided in such a manner as to surround the outer periphery of needle valve 13. Swirler chip 17 has a plurality of tangential fuel flow passageways 18 each extending in the tangential direction of needle valve 13. The tangential fuel flow passageways formed in swirler chip 17 serve to give rotational momentum (swirl flow component) to fuel flown into the nozzle hole 12. In the shown embodiment, the swirler is used as the swirl flow component generating means. Instead of using the swirler, a plurality of spiral guide grooves may be formed on the outer periphery of the needle valve so as to provide the same swirl flow component generating effect. In the injector 3 of the embodiment shown in FIGS. 1–7, an orifice axis L of nozzle hole 12 is identical to the axis of needle valve 13. As best seen from the plan view of FIG. 5, the lower end face of fuel injector body 11, which is formed with the nozzle hole (orifice) 12, is comprised of first, second and third surfaces 21, 22, and 23. First surface 21 corresponds to a left-hand side crescent-shaped plane. Second surface 22 corresponds to a right-hand side crescent-shaped plane that is out of a level of the left-hand side crescent-shaped plane (first surface 21). Third surface 23 corresponds to an inclined surface located between first and second surfaces 21 and 22 in a manner so as to interconnect the chord of the left-hand side crescent-shaped plane (first surface 21) and the chord of the right-hand side crescent-shaped plane (second surface 22) via the inclined surface 23. Each of first and second surfaces 21 and 22 are parallel to a reference plane, which is defined as a plane normal to orifice axis L of nozzle hole 12. As clearly shown in FIGS. 2, 3 and 4, first surface 21 is arranged at a lower level than second surface 22, so that the first surface is further projected downwards as compared to second surface 22. As seen from the cross sections of FIGS. 2 and 3, inclined surface 23 interconnecting first and second surfaces 21 and 22 is inclined by a predetermined inclination angle φ with respect to the reference plane. Inclined surface 23 of the embodiment shown in FIGS. 2–7 is formed as a right-hand up-sloped flat surface (viewing FIGS. 2–4). Nozzle hole 12 of fuel injector body 11 is formed within inclined surface 23. Such an orifice nozzle having a nozzle hole (or an orifice) 12 formed within inclined surface 23 is often called as "taper-cut orifice nozzle".

Figure 4:
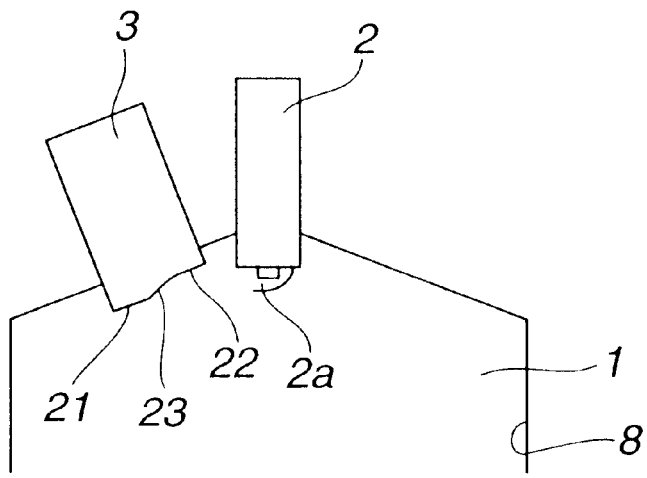
FIG. 4 is a cross sectional view showing the relationship between an installation position of a spark plug and a direction of an inclined surface inclined with respect to the orifice axis and including an opening end of the orifice nozzle tip.
Figure 5:
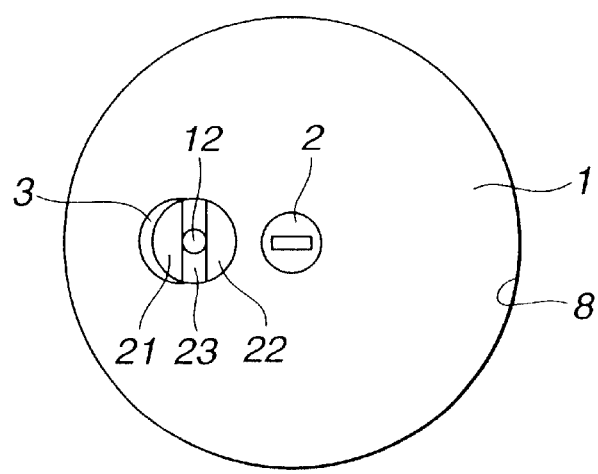
FIG. 5 is a plan view showing the relationship between the installation position of the spark plug and the direction of the inclined surface.

Referring to FIGS. 4 and 5, there is shown the relationship between the installation position of spark plug 2 and sense of inclined surface 23. Second surface 22, which is arranged at a higher level than first surface 21, is located in the vicinity of sparkplug 2. Therefore, injector 3 is laid out so that inclined surface 23 formed on the lower end face of fuel injector body 11 is directed toward spark plug 2 (exactly, the lower portion of spark plug 2).

Figure 6:
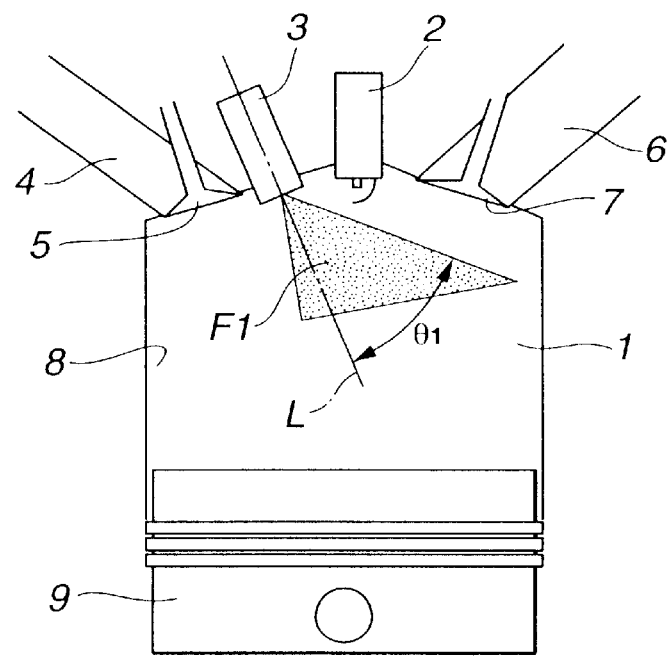
FIG. 6 is an explanatory view showing a state of fuel spray obtained just after the fuel injecting operation executed during the intake stroke, in a so-called narrow-spacing type DI engine.
Figure 7:
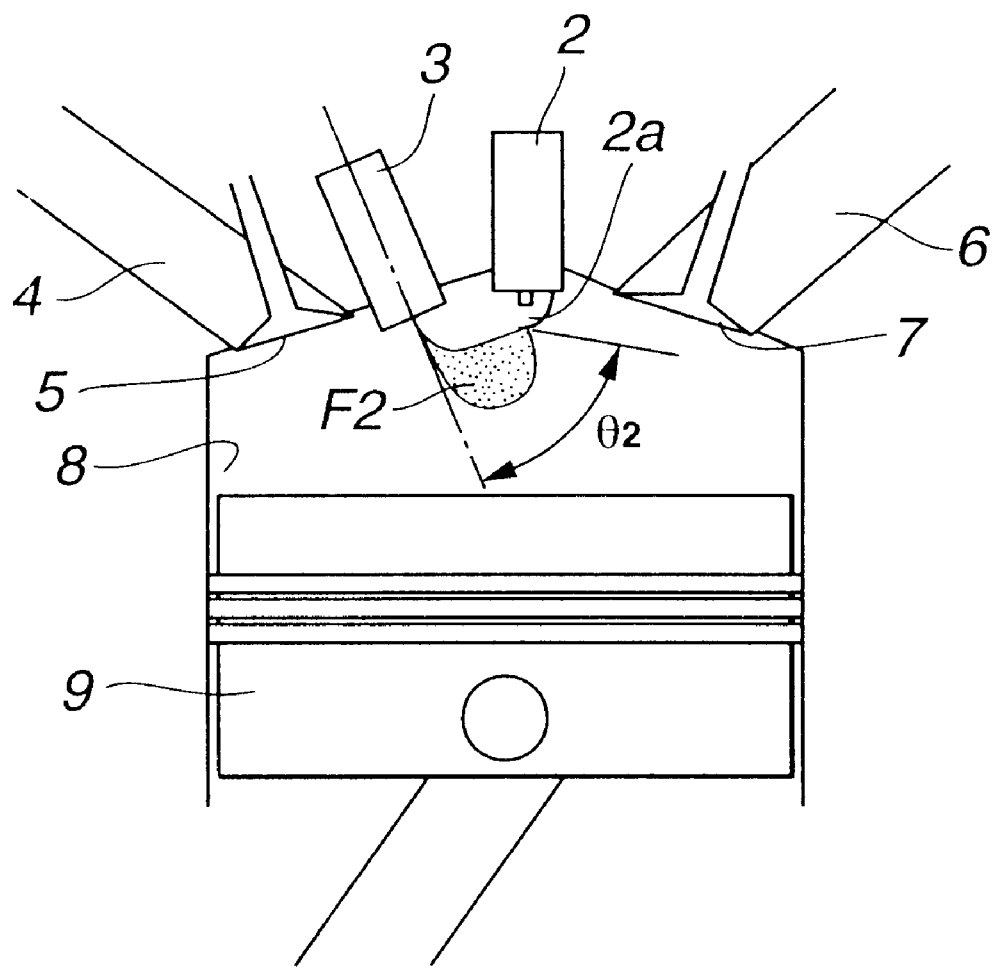
FIG. 7 is an explanatory view showing a state of fuel spray obtained upon expiration of a predetermined delay time from the start of fuel injection on the compression stroke, in the so-called narrow-spacing type DI engine.

The operation of inclined surface 23 formed on the lower end face of fuel injector body 11 is hereunder described in detail in reference to FIGS. 6 and 7.

As shown in FIG. 6, during high load operations, the DI engine of the embodiment operates in the homogeneous combustion mode that homogeneous-charge early fuel injection is executed on the intake stroke. That is, during the homogeneous combustion mode, the early fuel injection is made under a comparatively low in-cylinder pressure or a comparatively low ambient pressure, for example under an atmospheric pressure. In contrast, as shown in FIG. 7, during partial load conditions, the DI engine of the embodiment operates in the stratified combustion mode that stratified-charge late fuel injection is executed on the compression stroke. During the stratified combustion mode, the late fuel injection is made under a comparatively high in-cylinder pressure or a comparatively high ambient pressure, such as under a backpressure (e.g., 0.6 MPa). As a result of the taper-cut orifice nozzle having nozzle hole 12 formed within inclined surface 23, a spray axis of the substantially hollow cone fuel spray tends to be inclined rightwards from orifice axis L. In other words, the taper-cut orifice nozzle produces an inclined hollow cone spray pattern. In case of swirl DI fuel injector 3, the incoming fuel-flow mass has a circumferential fuel flow velocity component in the circumferential direction of nozzle hole 12 as well as an axial fuel flow velocity component in the orifice-axis direction. The circumferential fuel flow velocity component permits the fuel spray to effectively disperse or diffuse with the lapse of time after the start of fuel injection. As can be seen from the diffusing area of fuel spray F2 (see FIG. 7), which is obtained upon expiration of 3 milliseconds from the start of fuel injection under back pressure (0.6 MPa), the fuel spray tends to highly diffuse rightwards (toward the spark plug) by way of inclined surface 23.

Figure 8:
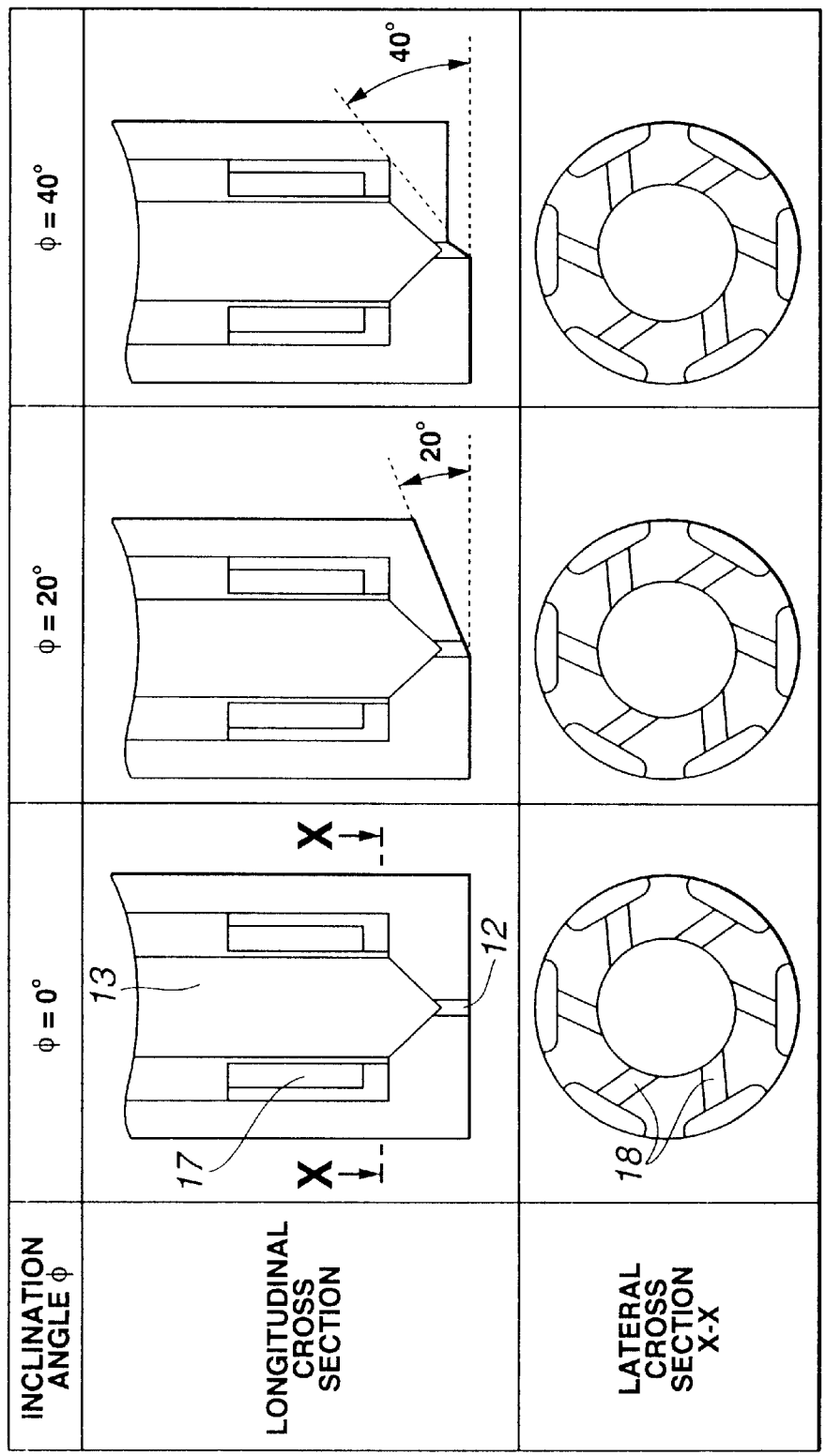
FIG. 8 is an explanatory view showing three different orifice nozzle tip shapes of swirl DI fuel injectors used for ambient-pressure dependent fuel spray pattern tests assured by the inventor.
Figure 9:
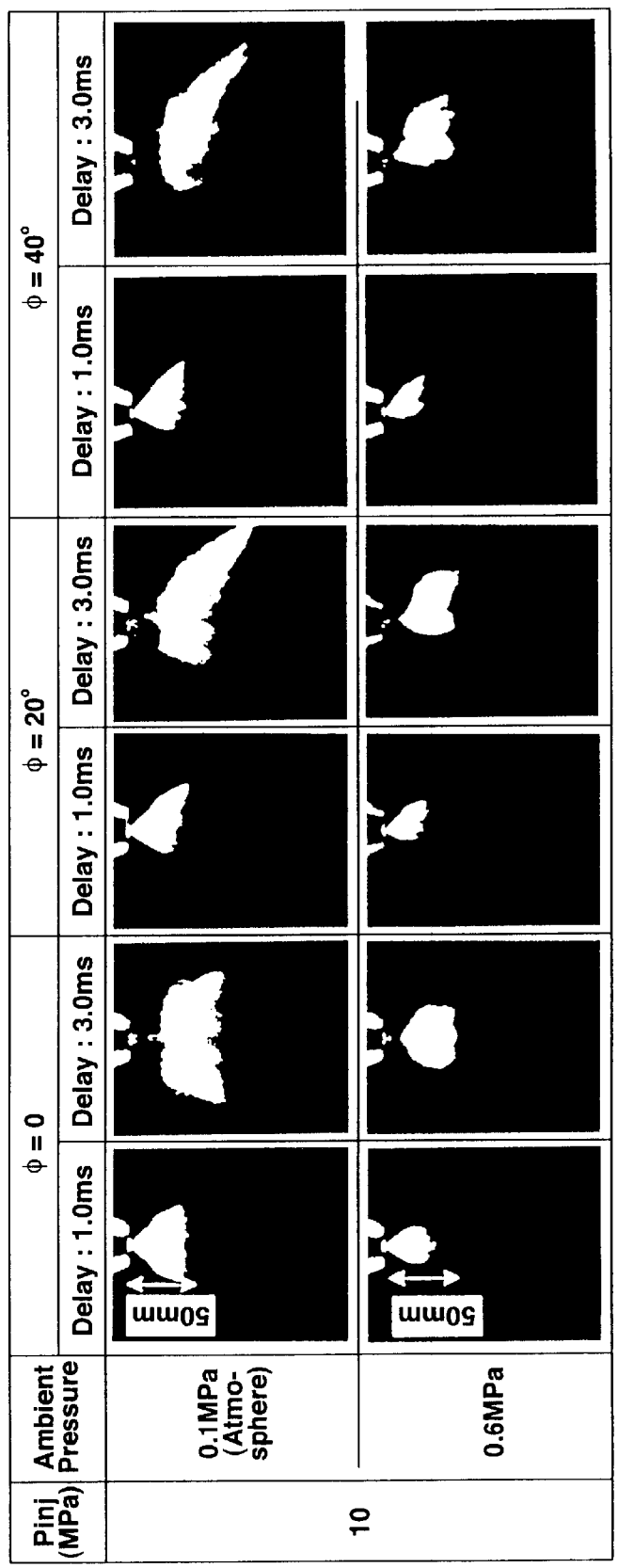
FIG. 9 is a table showing fuel-spray-pattern images captured by means of a CCD camera under two different ambient pressures, namely 0.1 MPa (under atmospheric pressure) and 0.6 MPa (under back pressure) and at three different inclination angles, that is, $\phi=0°$, $20°$, and $40°$.

FIG. 9 show experimental results of fuel spray patterns obtained by using three different orifice nozzle tip shapes shown in FIG. 8 (that is, at three different inclination angles, that is, φ=0°, 20°, and 40°), under two different ambient pressures, namely 0.1 MPa (under atmospheric pressure) and 0.6 MPa (under back pressure). Fuel-spray-pattern images shown in FIG. 9 are captured by means of a CCD (charge coupled device) camera, using a stroboscopic tube or a stroboscopic lamp. In FIG. 9, a first predetermined delay time of 1.0 millisecond means a time just after the start of fuel injection, whereas a second predetermined delay time of 3.0 milliseconds means a time when 3.0 milliseconds have expired from the start of fuel injection. The second predetermined delay time (3 milliseconds) is determined to be equivalent to a time duration from a start time of fuel spray injection to a time when the fuel spray injected from nozzle hole 12 reaches discharging gap 2a of spark plug 2, on the assumption that a distance D between nozzle hole 12 of injector 3 and discharging gap 2a of spark plug 2 is 40 mm. On the other hand, a fuel injection pressure Pinj is set at a fixed pressure value such as 10 MPa. As can be seen in FIG. 9, when the inclination angle φ is 0° and thus the lower end face of fuel injector body 11 is parallel to the reference plane normal to orifice axis L, the spray angle of the substantially hollow cone fuel spray tends to decrease or narrow under a comparatively high ambient pressure (that is, under the backpressure of 0.6 MPa). In case of inclination angle φ of 20° and in case of inclination angle φ of 40°, as a whole the fuel spray pattern tends to decrease or narrow under the backpressure of 0.6 MPa. However, as clearly seen in FIG. 9, the right-hand half of the inclined hollow cone fuel spray created by the inclined surface 23 whose inclination angle φ is 20° or 40°, tends to remain widened even under the backpressure of 0.6 MPa.

Figure 10A:
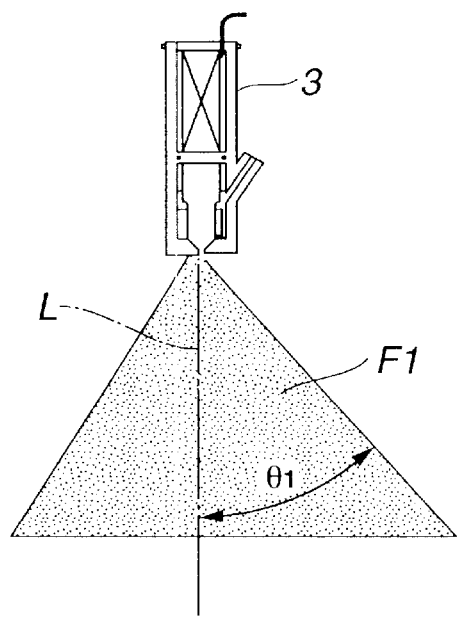
FIG. 10A is an explanatory view showing a spray angle $\theta_1$ of fuel spray F1 obtained just after the start of fuel injection under atmospheric pressure (0.1 MPa).
Figure 10B:
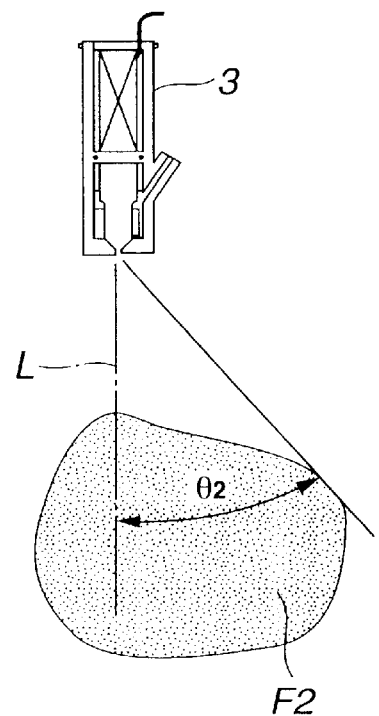
FIG. 10B is an explanatory view showing a spray angle $\theta_2$ of fuel spray F2 obtained upon expiration of 3 milliseconds from the start of fuel injection under back pressure (0.6 MPa).
Figure 11:
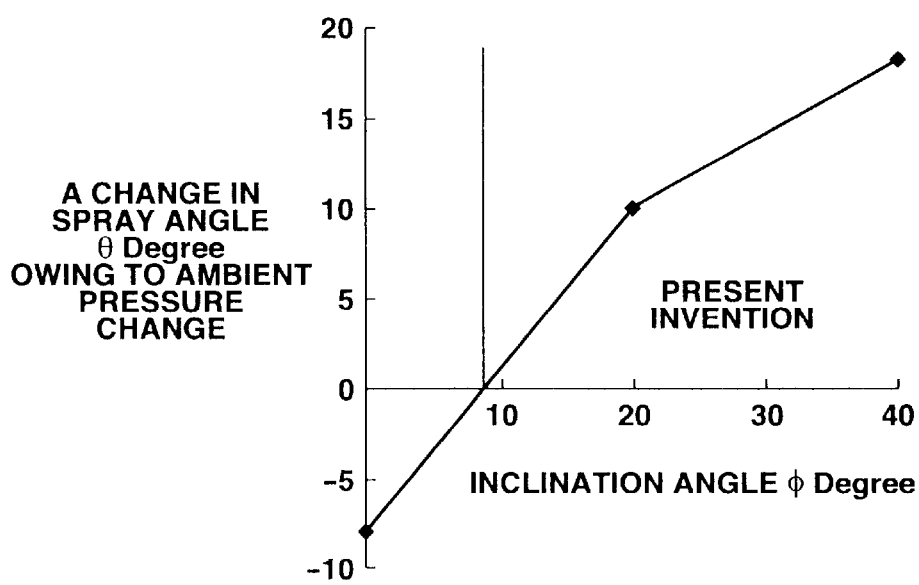
FIG. 11 is a graph illustrating the relationship between the inclination angle $\phi$ and a spray angle change $\theta$ occurring owing to an ambient pressure change.
Figure 12A:
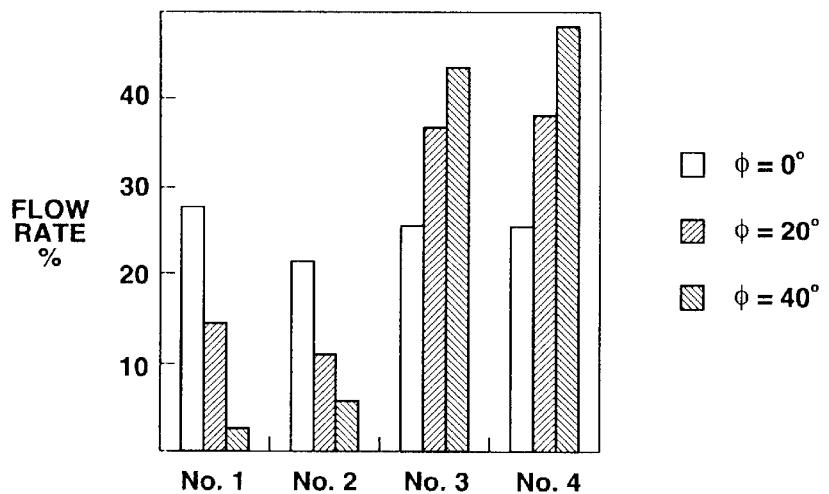
FIG. 12A is a bar graph showing the relationship between the respective inclination angle $\phi$ (=0°, 20°, and 40°) and fuel flow rate distribution among quadrants.
Figure 12B:
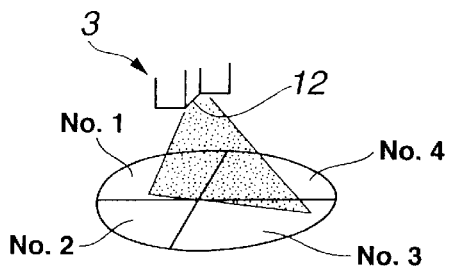
FIG. 12B is a perspective view showing the first, second, third, and fourth quadrants.
Figure 13:
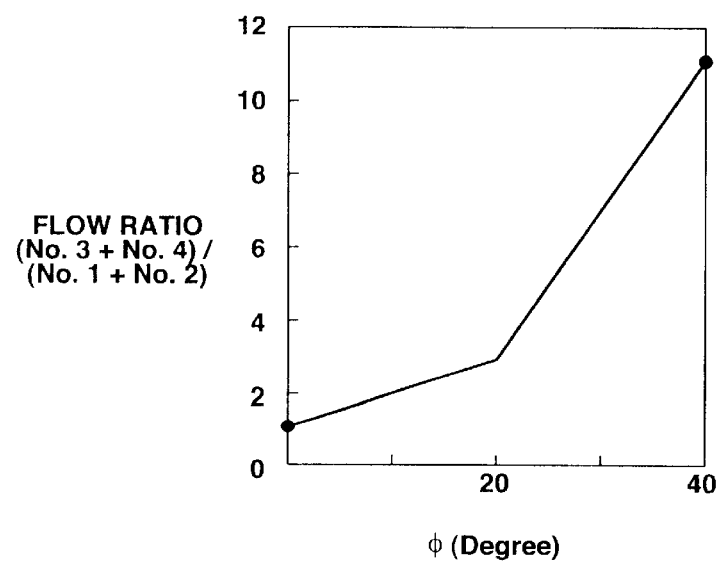
FIG. 13 is a graph showing the relationship between the inclination angle and a flow ratio (No. 3+No. 4)/(No. 1+No. 2) of the fuel flow rate of the left-hand side region of FIG. 12B (No. 1 quadrant+No. 2 quadrant) to the fuel flow rate of the right-hand side region of FIG. 12B (No. 3 quadrant+No. 4 quadrant).

Referring now to FIG. 11, there are shown results of quantitative analysis or numerical analysis for a change in spray angle based on both a change in inclination angle φ of inclined surface 23 and a change in ambient pressure. As shown in FIG. 10A, the spray angle denoted by $\theta_1$ means a spray angle of fuel spray F1 produced just after the start of fuel injection (exactly, with the first predetermined delay time of 1.0 millisecond after the start of fuel injection) under the atmospheric pressure (0.1 MPa). As shown in FIG. 10B, the spray angle denoted by $\theta_2$ means a spray angle of fuel spray F2 produced with the second predetermined delay time of 3.0 milliseconds after the start of fuel injection under the backpressure (0.6 MPa). Each of spray angles $\theta_1$ and $\theta_2$ is a spray angle of the right-hand half of the inclined hollow cone fuel spray, measured in the direction of inclination of the right-hand inclined or up-sloped surface 23. An ambient pressure change dependent spray angle change is determined or calculated as the spray angle difference $\theta$ ($=\theta_2-\theta_1$) between spray angle $\theta_2$ of fuel spray F2, which is obtained under a relatively high ambient pressure (0.6 MPa) with second delay time of 3.0 milliseconds from the start of fuel injection and spray angle $\theta_1$ of fuel spray F1, which is obtained under a relatively low ambient pressure (0.1 MPa) with first delay time of 1.0 millisecond from the start of fuel injection. As can be appreciated from the spray angle change $\theta$ ($=\theta_2-\theta_1$) versus inclination angle φ characteristic diagram shown in FIG. 11, there is a mutual relation between spray angle change $\theta$ ($=\theta_2-\theta_1$) and inclination angle φ. When inclination angle φ is in a comparatively small inclination angle range less than 10 degrees, the spray angle tends to decrease or narrow under the backpressure (under the comparatively high pressure of 0.6 MPa). Conversely when inclination angle φ is greater than or equal to 10 degrees, the spray angle tends to increase or widen even under the backpressure (under the comparatively high pressure of 0.6 MPa). The phenomenon that the spray angle is increased even under the backpressure (under the high ambient pressure of 0.6 MPa) is caused by inclination of the spray axis of the substantially hollow cone fuel spray injected from nozzle hole 12. The inclination of the spray axis arises from inclined surface 23. FIG. 12A shows comparison results of the fuel flow rate (unit: %) of each of quadrants, experimentally obtained at three different inclination angles, that is, φ=0°, 20°, and 40°. FIG. 12B defines the first (No. 1), second (No. 2), third (No. 3), and fourth (No. 4) quadrants. As shown in FIG. 12B, a pan is located just under nozzle hole 12 of injector 3, so as to receive fuel sprayed or injected from nozzle hole 12. The fuel flow rate is measured for each quadrant. As appreciated from the bar graph indicated by a blank space in FIG. 12A, when φ=0°, the fuel flow rates are almost the same in all of No. 1, No. 2, No. 3 and No. 4 quadrants. In contrast, as can be seen from the bar graph indicated by a right-hand diagonal shading area (in case of φ=20°) in FIG. 12A and the bar graph indicated by a left-hand diagonal shading area (in case of φ=40°) in FIG. 12A, there is an increased tendency for the fuel flow rate of the right-hand side region of FIG. 12B (that is, No. 3 quadrant+No. 4 quadrant) to become remarkably greater than the fuel flow rate of the left-hand side region of FIG. 12B (that is, No. 1 quadrant+No. 2 quadrant), as the inclination angle φ increases. Referring to FIG. 13, there is shown the mutual relation between inclination angle φ and a flow ratio (No. 3+No. 4)/(No. 1+No. 2) of the fuel flow rate of the left-hand side region of FIG. 12B (No. 1 quadrant+No. 2 quadrant) to the fuel flow rate of the right-hand side region of FIG. 12B (No. 3 quadrant+No. 4 quadrant). As seen in FIG. 13, when φ=10°, the flow ratio (No. 3+No. 4)/(No. 1+No. 2) is approximately "2". Therefore, assuming that inclination angle φ is set at a predetermined angle (preferably greater than 10 degrees) to achieve the flow ratio (No. 3+No. 4)/(No. 1+No. 2) greater than "2", there is a decreased tendency for the spray angle of the spark plug side (see the right-hand half of the substantially hollow cone fuel spray in FIG. 10B) to decrease or narrow under the backpressure (0.6 MPa). As can be appreciated from the above, the inventor of the present invention has discovered that it is possible to achieve a high level of reconciliation of the homogeneous charge combustion mode and the stratified charge combustion mode by optimizing inclination angle φ of inclined surface 23 of the taper-cut orifice nozzle. In laying out the injector, it is preferable to optimally set or design inclination angle φ of inclined surface 23 so that the outline of the upper portion of fuel spray F2 approaches the discharging gap 2a of spark plug 2, when fuel spray F2 advances or disperses toward discharging gap 2a of spark plug 2 in terms of the inclined hollow cone fuel spray during the late fuel injection on the compression stroke (see FIG. 7) or when a predetermined delay time (a diffusion time of fuel spray) substantially corresponding to distance D between nozzle hole 12 and discharging gap 2a has expired. Additionally, in order to improve the combustion performance (combustion stability, reduced emissions and enhanced power) and fuel spray characteristics (spatial distribution, spray angle, penetration length and fuel droplet size) of two combustion modes of early and late injection, it is more preferable to set or design inclination angle φ of inclined surface 23 so that spray angle $\theta_1$ of the initial fuel spray F1 (see FIG. 6), which is produced during the early fuel injection on the intake stroke, is less than or equal to spray angle $\theta_2$ of fuel spray F2, which is produced during the late fuel injection of the compression stroke (see FIG. 7).

Figure 14:
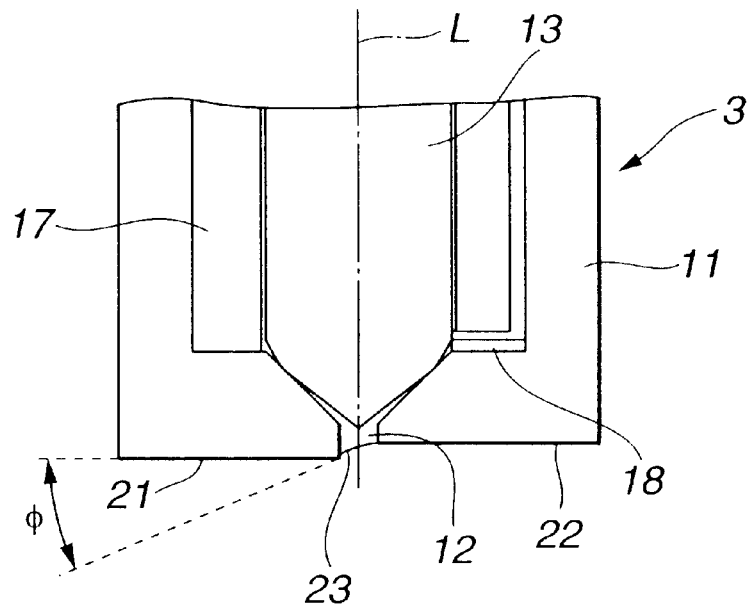
FIG. 14 is a partly enlarged cross-sectional view showing a first modification of the inclined surface of the swirl DI fuel injector nozzle tip.

Referring now to FIG. 14, inclined surface 23 of the first modification is formed as a concave curved surface that is concave down (in other words, convex up). On the other hand, inclined surface 23 of the embodiment shown in FIGS. 2–5 is formed as a right-hand up-sloped flat surface (see FIGS. 2–4).

Figure 15:
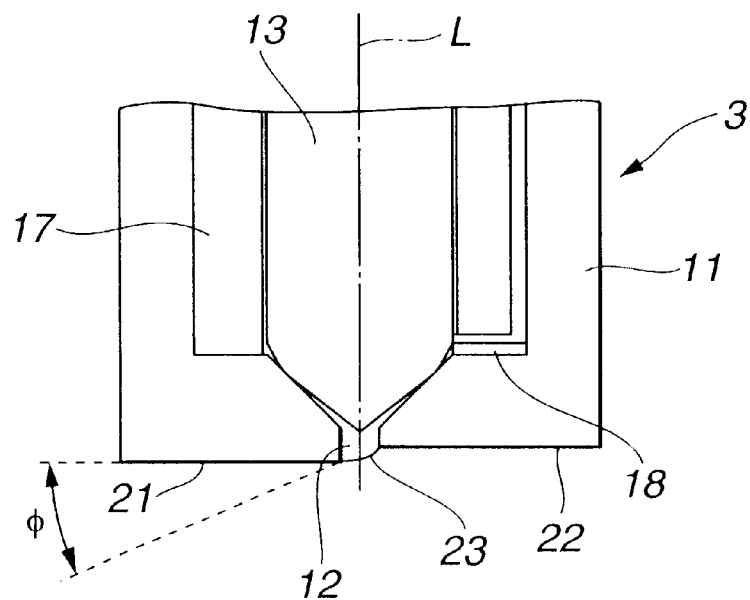
FIG. 15 is a partly enlarged cross-sectional view showing a second modification of the inclined surface of the swirl DI fuel injector nozzle tip.

Referring now to FIG. 15, inclined surface 23 of the second modification is formed as a convex curved surface that is convex down (in other words, concave up).

Figure 16:
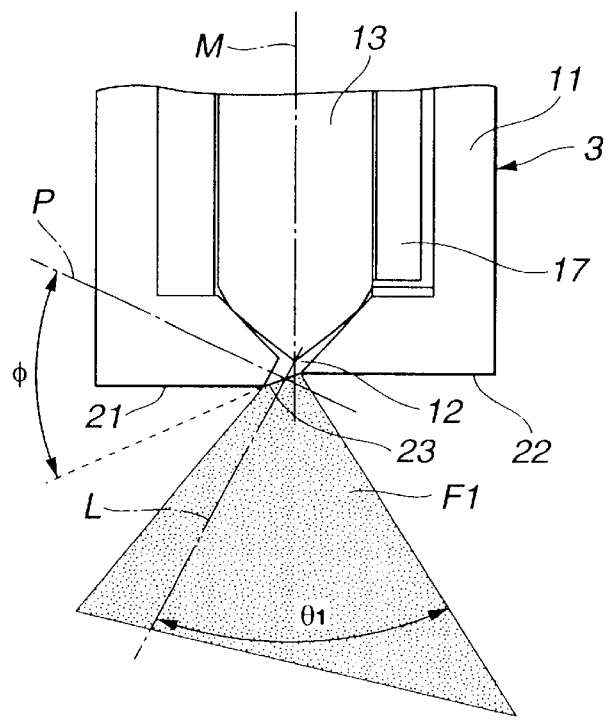
FIG. 16 is a partly enlarged cross-sectional view showing a modification of a swirl DI fuel injector nozzle tip having an inclined orifice axis L and also showing a state of fuel spray injected under atmospheric pressure (0.1 MPa).
Figure 17:
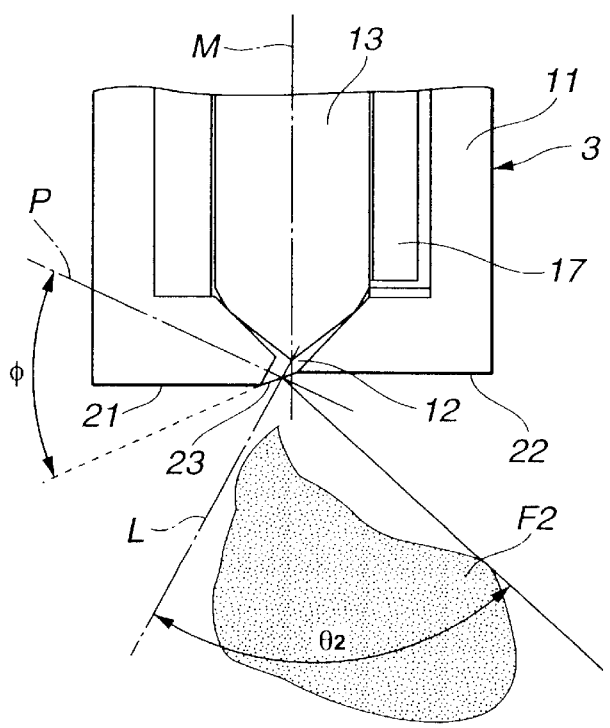
FIG. 17 is a partly enlarged cross-sectional view showing a state of fuel spray injected under backpressure (0.6 MPa) in the swirl DI fuel injector nozzle tip shown in FIG. 16.

Referring now to FIGS. 16 and 17, there is shown the swirl DI fuel injector nozzle tip of the modification having the inclined orifice axis L, which is inclined by a predetermined inclination angle with respect to an axis M of needle valve 13. In the same manner as the embodiment shown in FIGS. 1–7, in the injector nozzle tip of the modification of FIGS. 16 and 17, nozzle hole 12 is formed within inclined surface 23 provided between first and second surfaces 21 and 22. In the modification of FIGS. 16–17, inclined surface 23 is inclined by a predetermined inclination angle φ with respect to a reference plane P normal to orifice axis L of nozzle hole 12. Thus, the taper-cut orifice nozzle tip of the modification of FIGS. 16–17 with inclined surface 23 of predetermined inclination angle φ with respect to reference plane P can provide the same operation and effects as the embodiment described in reference to FIGS. 1–13. FIG. 16 shows the state of fuel spray F1, obtained with the first predetermined delay time of 1.0 millisecond after the start of early fuel injection on the intake stroke under the atmospheric pressure (0.1 MPa). On the other hand, FIG. 17 shows the state of fuel spray F2, obtained with the second predetermined delay time of 3.0 milliseconds after the start of late fuel injection on the compression stroke under the backpressure (0.6 MPa). As can be seen in FIG. 16, by means of inclined surface 23 of predetermined inclination angle φ, spray angle $\theta_1$ of the right-hand half of the inclined hollow cone fuel spray, measured in the direction of inclination of the right-hand inclined surface 23 tends to be remarkably greater than that of the left-hand half of the inclined hollow cone fuel spray. That is, the hollow cone fuel spray is greatly inclined rightwards (viewing FIG. 16) with respect to the inclined orifice axis L. As appreciated from comparison between the two fuel spray patterns shown in FIGS. 6 and 16, in case of the taper-cut orifice nozzle tip of the modification of FIGS. 16–17, the fuel spray itself is shifted leftwards (viewing FIG. 16) owing to the inclined orifice axis L. As can be seen in FIG. 17, with the second predetermined delay time of 3.0 milliseconds after the start of late fuel injection on the compression stroke under the backpressure (0.6 MPa), almost all of the fuel spray F2 is inclined rightwards with respect to the inclined orifice axis L. In order to improve the combustion performance and fuel spray characteristics of two combustion modes of early and late injection, in the taper-cut orifice nozzle tip of the modification of FIGS. 16–17, inclination angle φ of inclined surface 23 is set or determined so that spray angle $\theta_1$ of fuel spray F1 (see FIG. 16), which is produced during the early fuel injection on the intake stroke, is less than or equal to spray angle $\theta_2$ of fuel spray F2, which is produced during the late fuel injection of the compression stroke (see FIG. 17). As appreciated from the modification of FIGS. 16–17, it is possible to realize fuel spray characteristics more suitable to both of the homogeneous combustion mode and the stratified combustion mode by optimizing an inclination of the inclined orifice axis L with respect to the needle-valve axis M as well as inclination angle φ of inclined surface 23.

Figure 18:
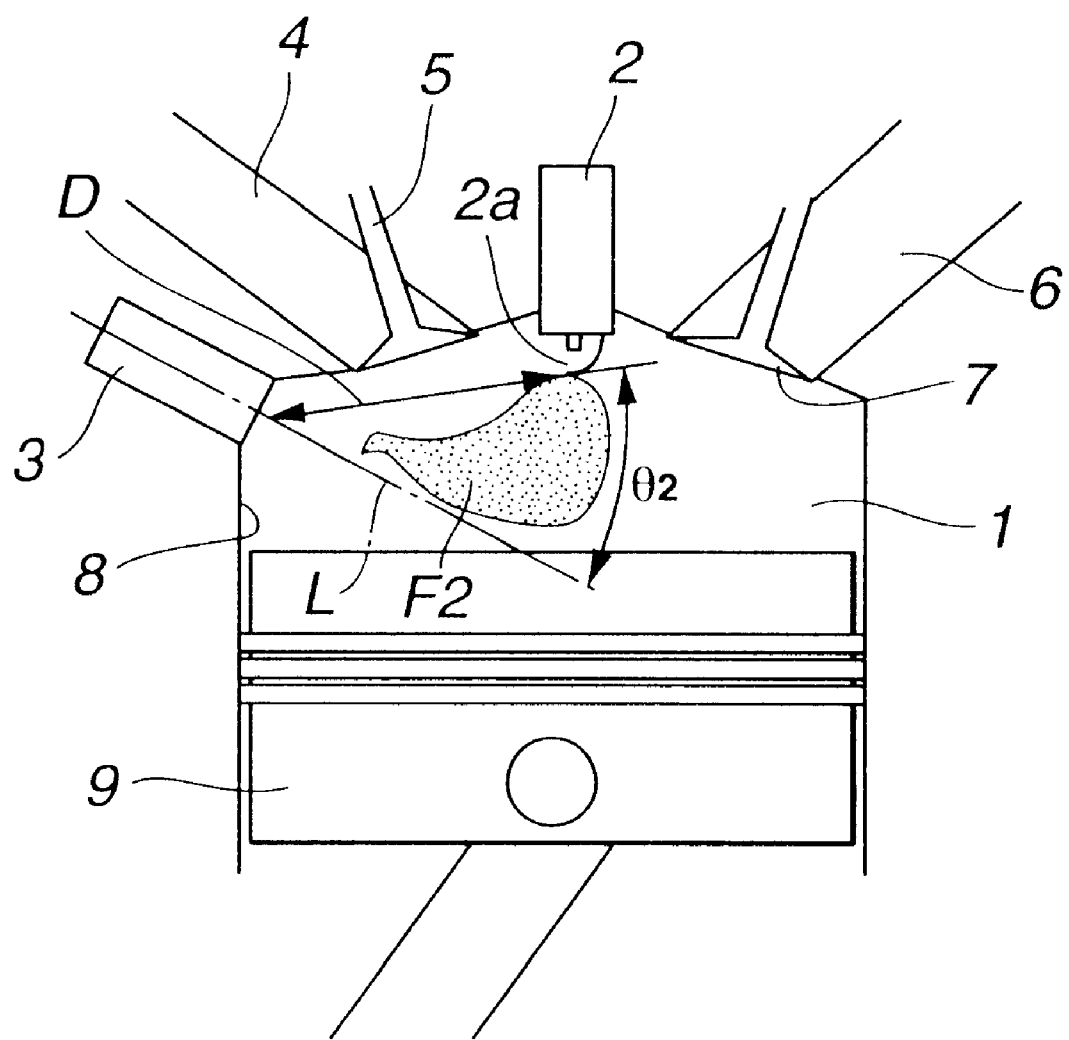
FIG. 18 is an explanatory view showing a state of fuel spray obtained upon expiration of a predetermined delay time from the start of fuel injection on the compression stroke, in a so-called wide-spacing type DI engine.

Referring now to FIG. 18, the fundamental concept of the embodiment shown in FIGS. 1–13 is applied to the wide-spacing type DI engine that distance D between nozzle hole 12 of injector 3 and discharging gap 2a of spark plug 2 is comparatively large and the intake-valve port is located between spark plug 2 and injector 3. As shown in FIG. 18, in the wide-spacing type, injector 3 is located in the outer periphery of cylinder 8. By properly optimally setting or determining inclination angle φ of inclined surface 23 within which nozzle hole 12 is formed, the swirl-DI-fuel-injector equipped wide-spacing type DI engine having a taper-cut orifice nozzle can provide the same operation and effects as the narrow-spacing type DI engine described previously. In the same manner as the narrow-spacing DI engine discussed above, in the wide-spacing type DI engine it is preferable to optimally set or design inclination angle φ of inclined surface 23, taking into account distance D between nozzle hole 12 and discharging gap 2a, so that the outline of the upper portion of fuel spray F2 approaches the discharging gap 2a of spark plug 2, when fuel spray F2 advances or disperses toward discharging gap 2a of spark plug 2 during the late fuel injection on the compression stroke (see FIG. 18) or when a predetermined delay time (a diffusion time of fuel spray) substantially corresponding to distance D between nozzle hole 12 and discharging gap 2a has expired. In addition to the above, in order to improve the combustion performance and fuel spray characteristics of two combustion modes of early and late injection, it is more preferable to set or design inclination angle φ of inclined surface 23 so that spray angle $\theta_1$ of the initial fuel spray F1, which is produced during the early fuel injection on the intake stroke, is less than or equal to spray angle $\theta_2$ of fuel spray F2, which is produced during the late fuel injection of the compression stroke (see FIG. 18).

The entire contents of Japanese Patent Application No. P2001-192447 (filed Jun. 26, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl-generating device that gives rotational momentum to the fuel injected into the nozzle hole, the orifice nozzle tip having an inclined surface that is formed on an end face of the orifice nozzle tip and inclined by a predetermined inclination angle with respect to a reference plane normal to an orifice axis of the nozzle hole, and the nozzle hole being formed within the inclined surface.

2. The in-cylinder direct injection spark-ignition internal combustion engine as claimed in claim 1, wherein:

the fuel injector is laid out so that the inclined surface is directed toward the spark plug.

3. The in-cylinder direct injection spark-ignition internal combustion engine as claimed in claim 1, wherein:

the predetermined inclination angle of the inclined surface is set so that a spray angle of fuel spray, which is produced during the stratified-charge late fuel injection on the compression stroke, is greater than or equal to a spray angle of fuel spray, which is produced during the homogeneous-charge early fuel injection on the intake stroke.

4. The in-cylinder direct injection spark-ignition internal combustion engine as claimed in claim 1, wherein:

the fuel injector is laid out so that an outline of fuel spray produced during the stratified-charge late fuel injection on the compression stroke approaches the discharging gap of the spark plug.

5. The in-cylinder direct injection spark-ignition internal combustion engine as claimed in claim 1, wherein:

the predetermined inclination angle is set so that an outline of fuel spray produced during the stratified-charge late fuel injection on the compression stroke approaches the discharging gap of the spark plug with a predetermined delay time substantially corresponding to a distance between the nozzle hole and the discharging gap.

6. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl-generating device that gives rotational momentum to the fuel injected into the nozzle hole, the orifice nozzle tip having an inclined surface that is formed on an end face of the orifice nozzle tip and inclined by a predetermined inclination angle with respect to a reference plane normal to an orifice axis of the nozzle hole, and the nozzle hole being formed within the inclined surface, wherein:

the predetermined inclination angle is dimensioned to be greater than or equal to 10 degrees.

7. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl-generating device that gives rotational momentum to the fuel injected into the nozzle hole, the orifice nozzle tip having an inclined surface that is formed on an end face of the orifice nozzle tip and inclined by a predetermined inclination angle with respect to a reference plane normal to an orifice axis of the nozzle hole, the predetermined inclination angle being based on both an in-cylinder pressure dependent spray characteristic during the stratified-charge late fuel injection on the compression stroke and an in-cylinder pressure dependent spray characteristic during the homogeneous-charge early fuel injection on the intake stroke, and the nozzle hole being formed within the inclined surface.

8. The in-cylinder direct injection spark-ignition internal combustion engine as claimed in claim 7, wherein:

the fuel injector is laid out so that the inclined surface is directed toward the spark plug.

9. The in-cylinder direct injection spark-ignition internal combustion engine as claimed in claim 7, wherein:

the predetermined inclination angle of the inclined surface is set so that a spray angle of fuel spray, which is produced during the stratified-charge late fuel injection on the compression stroke, is greater than or equal to a spray angle of fuel spray, which is produced during the homogeneous-charge early fuel injection on the intake stroke.

10. The in-cylinder direct injection spark-ignition internal combustion engine as claimed in claim 7, wherein:

the fuel injector is laid out so that an outline of fuel spray produced during the stratified-charge late fuel injection on the compression stroke approaches the discharging gap of the spark plug.

11. The in-cylinder direct injection spark-ignition internal combustion engine as claimed in claim 7, wherein:

the predetermined inclination angle is set so that an outline of fuel spray produced during the stratified-charge late fuel injection on the compression stroke approaches the discharging gap of the spark plug with a predetermined delay time substantially corresponding to a distance between the nozzle hole and the discharging gap.

12. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl-generating device that gives rotational momentum to the fuel injected into the nozzle hole, the orifice nozzle tip having an inclined surface that is formed on an end face of the orifice nozzle tip and inclined by a predetermined inclination angle with respect to a reference plane normal to an orifice axis of the nozzle hole, the predetermined inclination angle being based on both an in-cylinder pressure dependent spray characteristic during the stratified-charge late fuel injection on the compression stroke and an in-cylinder pressure dependent spray characteristic during the homogeneous-charge early fuel injection on the intake stroke, and the nozzle hole being formed within the inclined surface, wherein:

the predetermined inclination angle is dimensioned to be greater than or equal to 10 degrees.

13. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl flow component generating means for giving rotational momentum to the fuel injected into the nozzle hole, the orifice nozzle tip having an inclined surface formed on an end face of the orifice nozzle tip and inclined by a predetermined inclination angle with respect to a reference plane normal to an orifice axis of the nozzle hole for creating an inclined substantially hollow cone fuel spray, the predetermined inclination angle of the inclined surface being based on both an in-cylinder pressure dependent spray characteristic during the stratified-charge late fuel injection on the compression stroke and an in-cylinder pressure dependent spray characteristic during the homogeneous-charge early fuel injection on the intake stroke, and the nozzle hole being formed within the inclined surface.

14. The in-cylinder direct injection spark-ignition internal combustion engine as claimed in claim 13, wherein:

the inclined surface comprises a flat surface that is sloped toward the spark plug.

15. The in-cylinder direct injection spark-ignition internal combustion engine as claimed in claim 13, wherein:

the inclined surface comprises a concave curved surface that is concave down.

16. The in-cylinder direct injection spark-ignition internal combustion engine as claimed in claim 13, wherein:

the inclined surface comprises a convex curved surface that is convex down.

17. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl flow component generating means for giving rotational momentum to the fuel injected into the nozzle hole, the orifice nozzle tip having an inclined surface formed on an end face of the orifice nozzle tip and inclined by a predetermined inclination angle with respect to a reference plane normal to an orifice axis of the nozzle hole for creating an inclined substantially hollow cone fuel spray, the predetermined inclination angle of the inclined surface being based on both an in-cylinder pressure dependent spray characteristic during the stratified-charge late fuel injection on the compression stroke and an in-cylinder pressure dependent spray characteristic during the homogeneous-charge early fuel injection on the intake stroke, and the nozzle hole being formed within the inclined surface, wherein said engine further comprises:

a needle valve movable in a direction of the orifice axis to open and close the nozzle hole by axial movement of the needle valve, wherein the swirl flow component generating means comprises a swirler chip having a plurality of tangential fuel flow passageways each extending in a tangential direction of the needle valve to create a circumferential fuel flow velocity component in a circumferential direction of the nozzle hole.

18. The in-cylinder direct injection spark-ignition internal combustion engine as claimed in claim 17, wherein:

the orifice axis is inclined by a predetermined inclination angle with respect to an axis of the needle valve, the predetermined inclination angle of the orifice axis being based on both the in-cylinder pressure dependent spray characteristic during the stratified-charge late fuel injection on the compression stroke and the in-cylinder pressure dependent spray characteristic during the homogeneous-charge early fuel injection on the intake stroke.

19. An in-cylinder direct injection spark-ignition internal combustion engine capable of switching between a homogeneous combustion mode in which homogeneous-charge early fuel injection is executed on an intake stroke and a stratified combustion mode in which stratified-charge late fuel injection is executed on a compression stroke, comprising:

a fuel injector having an orifice nozzle tip in which a nozzle hole is formed to inject fuel through the nozzle hole directly into a combustion chamber;

a spark plug that provides a discharging gap in the combustion chamber; and a swirl-generating device that gives rotational momentum to the fuel injected into the nozzle hole, wherein the nozzle hole has a predetermined nonzero average inclination angle with respect to a reference plane normal to an orifice axis of the nozzle hole.

20. The in-cylinder direct injection spark-ignition internal combustion engine as claimed in claim 19, wherein the predetermined average inclination angle is at least 10 degrees.

* * * * *